(12) United States Patent
Bakir et al.

(10) Patent No.: US 10,051,108 B2
(45) Date of Patent: Aug. 14, 2018

(54) CONTEXTUAL INFORMATION FOR A NOTIFICATION

(71) Applicant: Google LLC, Mountain View, CA (US)

(72) Inventors: Gokhan H. Bakir, Zurich (CH); Marcin M. Nowak-Przygodzki, Zurich (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/388,860

(22) Filed: Dec. 22, 2016

(65) Prior Publication Data
US 2018/0027110 A1    Jan. 25, 2018

Related U.S. Application Data

(60) Provisional application No. 62/365,046, filed on Jul. 21, 2016.

(51) Int. Cl.
| | |
|---|---|
| *H04M 1/725* | (2006.01) |
| *H04W 4/12* | (2009.01) |
| *H04W 4/18* | (2009.01) |

(52) U.S. Cl.
CPC ......... *H04M 1/72569* (2013.01); *H04W 4/12* (2013.01); *H04W 4/185* (2013.01); *H04M 1/72566* (2013.01)

(58) Field of Classification Search
CPC .... H04M 1/72569; H04W 4/12; H04W 4/185
USPC ........................................................ 455/466
See application file for complete search history.

(56) References Cited

U.S. PATENT DOCUMENTS

| | | | |
|---|---|---|---|
| 7,389,181 B2 | 6/2008 | Meadow | |
| 7,689,613 B2 | 3/2010 | Candelore | |
| 7,788,266 B2 | 8/2010 | Venkataraman | |
| 8,316,019 B1 | 11/2012 | Ainslie et al. | |
| 8,321,406 B2 | 11/2012 | Garg et al. | |
| 8,391,618 B1 | 3/2013 | Chuang | |
| 8,392,435 B1 | 3/2013 | Yamauchi | |
| 8,515,185 B2 | 8/2013 | Lee | |
| 8,521,764 B2 | 8/2013 | Pfleger | |
| 8,606,781 B2 | 12/2013 | Chi et al. | |

(Continued)

OTHER PUBLICATIONS

U.S. Appl. No. 13/069,978, filed Mar. 23, 2011, Taubman et al.

(Continued)

*Primary Examiner* — Kamran Afshar
*Assistant Examiner* — Nicole Louis-Fils
(74) *Attorney, Agent, or Firm* — Fish & Richardson P.C.

(57) ABSTRACT

Methods, systems, and apparatus, including computer programs encoded on a computer storage medium, for providing contextual information for a notification. In one aspect, a method includes receiving, from a user device in response to the user device obtaining a notification in response to an occurrence of a trigger event, a query-independent request for contextual information relevant to the notification, identifying multiple search items from content in the notification, determining a relevance score for each of the multiple search items, selecting one or more of the multiple search items based on the relevance scores, and providing, to the user device for each of the selected one or more multiple search items, a respective user interface element for display with the notification, wherein each user interface element includes contextual information regarding the respective search item.

20 Claims, 5 Drawing Sheets

(56) References Cited

U.S. PATENT DOCUMENTS

| | | |
|---|---|---|
| 8,898,095 B2 | 11/2014 | Agrawal |
| 2001/0053968 A1 | 12/2001 | Galitsky |
| 2007/0060114 A1 | 3/2007 | Ramer et al. |
| 2007/0071320 A1 | 3/2007 | Yada |
| 2007/0140595 A1 | 6/2007 | Taylor |
| 2007/0214131 A1 | 9/2007 | Cucerzan |
| 2008/0046405 A1 | 2/2008 | Olds et al. |
| 2008/0270110 A1 | 10/2008 | Yurick |
| 2008/0270761 A1* | 10/2008 | Rasmussen ............ G06Q 10/10 712/209 |
| 2010/0241663 A1 | 9/2010 | Huang et al. |
| 2010/0306249 A1 | 12/2010 | Hill |
| 2011/0035406 A1 | 2/2011 | Petrou et al. |
| 2011/0038512 A1 | 2/2011 | Petrou et al. |
| 2011/0125735 A1 | 5/2011 | Petrou |
| 2011/0128288 A1 | 6/2011 | Petrou et al. |
| 2011/0131241 A1 | 6/2011 | Petrou et al. |
| 2011/0137895 A1 | 6/2011 | Petrou et al. |
| 2012/0109858 A1 | 5/2012 | Makadia et al. |
| 2012/0166433 A1 | 6/2012 | Tseng |
| 2012/0191745 A1 | 7/2012 | Velipasaoglu et al. |
| 2012/0215533 A1 | 8/2012 | Aravamudan et al. |
| 2013/0024762 A1* | 1/2013 | Chow .................. G06F 17/241 715/230 |
| 2013/0132361 A1 | 5/2013 | Chen et al. |
| 2013/0346400 A1 | 12/2013 | Ramsey et al. |
| 2014/0006390 A1* | 1/2014 | Friedlander ....... G06F 17/30722 707/723 |
| 2014/0046935 A1 | 2/2014 | Bengio et al. |
| 2014/0172881 A1 | 6/2014 | Petrou et al. |
| 2014/0201675 A1* | 7/2014 | Joo ...................... G06F 3/0481 715/784 |
| 2015/0058318 A1 | 2/2015 | Blackwell |
| 2016/0188599 A1 | 6/2016 | Maarek et al. |
| 2016/0203238 A1 | 7/2016 | Cherniavski et al. |
| 2016/0360382 A1* | 12/2016 | Gross ................... G06F 3/0488 |

OTHER PUBLICATIONS

U.S. Appl. No. 13/906,889, filed May 31, 2013, Heiler et al.

U.S. Appl. No. 14/313,519, filed Jun. 24, 2014, Bakir et al.

"10 Mobile Astronomy Apps for Stargazers," [online][Retrieved on Apr. 29, 2014]; Retrieved from the Internet URL: http://mashable.com/2011/06/21/astronomy-mobile-apps/, 2011, 13 pages.

"Google announces Search by Image and Voice Search for desktop, revamped mobile search," [online] Jun. 14, 2011 [Retrieved on Mar. 22, 2017] Retrieved from the Internet URL: https://www.engadget.com/2011/06/14/google-announces-search-by-image-search-by-voice-for-desktop/> 1 page.

"Google's Impressive "Conversational Search" Goes Live on Chrome," [online] [Retrieved on May 5, 2014]; Retrieved from the Internet URL: http://searchengineland.com/googles-impressive-conversational-search-goes-line-on-chrome-160445, 2013, 12 pages.

Zhang et al., "Probabilistic Query Rewriting for Efficient and Effective Keyword Search on Graph Data," Proceedings of the VLDB Endowment 6(14):1642-1653, 2013, 12 pages.

International Search Report and Written Opinion issued in International Application No. PCT/US2017/041856, dated Oct. 30, 2017, 8 pages.

Office Action issued in British Application No. GB1711763.1, dated Jan. 9, 2018, 8 pages.

* cited by examiner

CONTEXTUAL INFORMATION FOR A NOTIFICATION

CLAIM OF PRIORITY

This application claims priority under 35 USC § 119(e) to U.S. Patent Application Ser. No. 62/365,046, filed on Jul. 21, 2016 the entire contents of which are hereby incorporated by reference.

BACKGROUND

This specification relates to providing contextual information to a user.

A device may provide a user with contextual information. For example, a device may display a web page about a particular subject, receive a search query from the user including search terms for the particular subject, retrieve search results responsive to the search query, and provide the search results to the user.

Typical interaction models require users to provide some form of a user query to a user device. For example, a user may have set a notification to be reminded when a movie is going to be released in the theaters. The day before the release date, a notification of "Movie X releases tomorrow" may appear on user's smart phone. The user may then decide to check movie reviews to determine whether to go see the movie. Accordingly, the user may state "phone, show me reviews for Movie X." A search process then executes a search of resources using the query of "reviews for Movie X" to identify resources that may satisfy the user's informational needs.

SUMMARY

In general, one innovative aspect of the subject matter described in this specification can be embodied in methods that include the actions of receiving, from a user device in response to the user device obtaining a notification in response to an occurrence of a trigger event, a query-independent request for contextual information relevant to the notification, identifying multiple search items from content in the notification, determining a relevance score for each of the multiple search items, selecting one or more of the multiple search items based on the relevance scores, and providing, to the user device for each of the selected one or more multiple search items, a respective user interface element for display with the notification, where each user interface element includes contextual information regarding the respective search item.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In certain aspects, receiving, from a user device in response to the user device obtaining a notification in response to an occurrence of a trigger event, a query-independent request for contextual information relevant to the notification includes receiving a query-independent request that does not include one or more terms entered by a user and includes the content in the notification. In some aspects, receiving, from a user device in response to the user device obtaining a notification in response to an occurrence of a trigger event, a query-independent request for contextual information relevant to the notification includes receiving, from the user device in response to the user device generating the notification in response to the occurrence of the trigger event, a query-independent request for contextual information relevant to the notification. In some implementations, receiving, from a user device in response to the user device obtaining a notification in response to an occurrence of a trigger event, a query-independent request for contextual information relevant to the notification includes receiving, from the user device in response to the user device obtaining the notification in response to determining that a background application is providing the notification for display.

In certain aspects, the notification includes a user interface element that is overlaid on a graphical user interface. In some aspects, the trigger event includes one or more of satisfaction of reminder criteria for a calendar appointment, receipt of a text message from another user while not viewing a text message conversation with the other user, or an application on the user device receiving a push notification from a server. In some implementations, identifying multiple search items from the content in the notification includes extracting, from the query-independent request, text in the notification and identifying the multiple search items from the text. In certain aspects, identifying multiple search items from the content in the notification includes extracting, from the query-independent request, an indication of an application corresponding to the notification and identifying the multiple search items based at least on the application corresponding to the notification.

In general, one innovative aspect of the subject matter described in this specification can be embodied in methods that include the actions of obtaining, in response to an occurrence of a trigger event and by a user device, a notification for display on the user device, the notification regarding a search item, in response to obtaining the notification for display on the user device, providing, by the user device to a contextual information server, a query-independent request for contextual information relevant to the notification, receiving a user interface element that includes contextual information regarding the search item, and displaying the notification and the user interface element simultaneously on the user device.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In certain aspects, providing by the user device to a contextual information server, a query-independent request for contextual information relevant to the notification includes providing a query-independent request that does not include one or more terms entered by a user and includes the content in the notification. In some aspects, the notification includes a user interface element that is overlaid on a graphical user interface. In some implementations, the trigger event includes one or more of satisfaction of reminder criteria for a calendar appointment, receipt of a text message from another user while not viewing a text message conversation with the other user, or an application on the user device receiving a push notification from a server.

Particular embodiments of the subject matter described in this specification can be implemented so as to realize one or more of the following advantages. Contextual information that is likely to satisfy a user's informational need when receiving a notification may be provided by a device to a user without the user providing a query to the device or even requesting contextual information when viewing the notification. This results in a convenient way for the user to obtain contextual information for notifications. The user no longer needs to type in query terms or speak query terms to obtain contextual information. In fact, when receiving the notification, the user may receive contextual information without providing any indication that the user desires contextual information for the notification. Accordingly, users receive contextual information in a manner that is not only convenient for the user, but also in a relatively discrete manner so that bystanders are not disturbed by the user speaking into the device. Also, because the user need not type in a query or provide any indication that contextual information is desired, the user may, in some implementations, receive contextual information when the user would otherwise be unable to type or provide the indication effectively, e.g., when the user only has one hand free.

Also, because the contextual information can be provided without input from the user, the system does not need to perform text-to-speech processing or process typing input. This results in fewer input errors and erroneously input queries. Accordingly, when considered in the aggregate, thousands of erroneous and inaccurate queries are avoided, which in turn, provides a more efficient use of search system resources. In other words, multiple erroneous query processing cycles are avoided, which reduces processing resources required and reduces overall system bandwidth requirements (or, alternatively, enables a larger number of users to be serviced without a commensurate increase in processing resources). This improvement in the technological field of search processing is thus another distinct advantage realized by the systems and methods described below.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A user may desire to receive additional information regarding subject matter of a notification shown on a device. For example, a user may be browsing a website when a notification of "Movie X releases tomorrow" may be generated for a reminder that the user set in a calendar application when viewing the notification. The user may desire to obtain additional information about "Movie X." Accordingly, the user may open a web page for a search engine, type in "Movie X," and then select a search result to view. However, this process may be time consuming and require multiple interactions by the user.

Described below are systems and methods for providing contextual information for a notification. Instead of providing contextual information based on a query entered by a user, the system may provide contextual information relevant to a notification without receiving a query input or an indication from the user requesting contextual information for the notification. To provide the contextual information, the system may determine that a user device has obtained a notification and, in response, identify search items from the content of the notification and then provide contextual information about the identified search items to the user. For example, the system may identify that the text "Movie X" in the notification matches with a movie named "Movie X," and, in response, display a short description, a rating, and local movie times for "Movie X" along with the notification.

Figure 1:
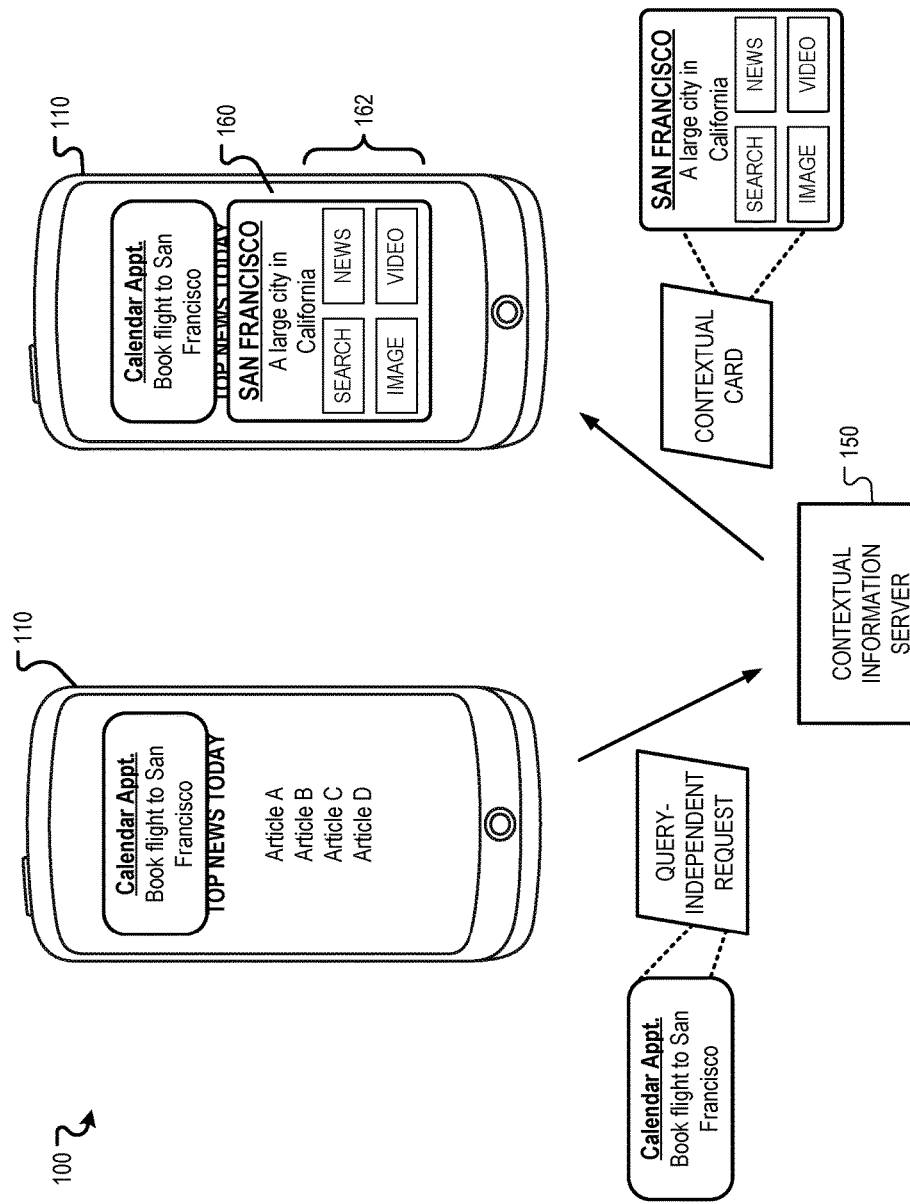
FIG. 1 is a block diagram of an example environment in which contextual information is provided for a notification.

FIG. 1 is a block diagram of an example environment 100 in which contextual information is provided for a notification. The environment 100 includes a user device 110 and a contextual information server 150.

A user device 110 is used by a user to obtain contextual information for a notification. The user device 110 is an electronic device that is capable of displaying notifications. Example user devices 110 include personal computers (e.g., desktops or laptops), mobile communication devices (e.g., smart phones or tablets), and other devices that can send and receive data over the network (e.g., televisions, and glasses or watches with network communication functionality). A user device typically includes a user application, e.g., a web browser, to facilitate the sending and receiving of data over the network. The web browser can enable a user to display and interact with text, images, videos, music and other information typically located on a web page at a website on the World Wide Web or a local area network. The user device 110 may use any appropriate application to send and receive data over the network and present data to a user.

The user device 110 may also include applications that can generate notifications. For example, the user device 110 may include one or more of a calendar application that can generate notifications for reminders, a messaging application that can generate notifications when messages are received by the user device 110, a restaurant reservation application that can generate notifications when reservations are upcoming, a news application that can generate notifications when a push notification for a news update is received by the user device 110, or some other application. The applications may be running in a background of the user device 110 when generating notifications. For example, a user may be using the user device 110 to play a game when a messaging application receives a message and, in response, the user device 110 may display a notification that includes an initial portion of the received message over a graphical user interface for the game. Notifications can also be received in the absence of an application, such as a push notification to a user device that can be received independent of the active status of any particular application.

A notification is information that is provided to a user in response to an occurrence of a trigger event. For example, a notification may be a graphical user element that is displayed on a screen of the user device 110 and includes text or images that informs a user of the occurrence of a trigger event. In another example, a notification may be audio output that is provided through a microphone of a user device 110 and includes synthesized speech that informs a user of an occurrence of a trigger event. A trigger event may be an event that triggers a notification to be provided to a user. For example, a trigger event includes one or more of satisfaction of reminder criteria for a calendar appointment, receipt of a text message from another user while a user is not viewing a text message conversation with the other user, an application on the user device receiving a push notification from a server, or some other event.

The user device 110 may obtain a notification and, in response, provide a request to the contextual information server 150 for contextual information for the notification. For example, the user device 110 may obtain a notification of "Calendar Appt.—Book flight to San Francisco" generated by a calendar application running in a background of the user device 110 and, in response, provide a request that includes the text "Book flight to San Francisco" before the notification is displayed or provide a request that includes a screenshot of the notification as displayed on the user device 110. As shown in FIG. 1, the notification is provided while the user is viewing a new application.

The request may be considered a query-independent request as the user device 110 provides the request to the contextual information server 150 without having the user enter terms for a query, whether verbally, physically, or through some other interaction. For example, once the user device 110 obtains a notification to provide a user, the user device 110 may provide the request to the contextual information server 150 without input from the user after the notification is obtained.

In response to providing the request to the contextual information server 150, the user device 110 then receives one or more user interface elements from the contextual information server 150. For example, the user device 110 may receive a user interface element for "San Francisco" from the contextual information server 150. For the purposes of illustration, the user interface elements are described as cards. However, other user interface elements may be used, for example, chat bubbles, selectable linked notes or footnotes, synthesized voice responses, or other forms. A contextual card may be data that includes contextual information about a search item. For example, a contextual card for "San Francisco" may include contextual information that describes that "San Francisco" is "A large city in California." The contextual card may indicate next actions. For example, the contextual card for "San Francisco" may include selectable options for performing searches for web pages, news, images, or videos relevant to a query including the terms "San Francisco."

The user device 110 provides the received contextual cards to the user. For example, the user device 110 may provide the contextual cards by generating a graphical panel 160 that is shown adjacent to a notification and overlaid on top of anything that was being displayed by the user device 110 before the notification was displayed. The graphical panel 160 identifies that the graphical panel is for the item "San Francisco" and San Francisco is "A large city in California" and includes selectable options 162 for performing searches for web pages, news, images, or videos relevant to a query including the terms "San Francisco."

In the example of FIG. 1, the selectable options 162 are general options obtained for the search item "San Francisco." However, options that are more specific to the content of the notification can also be provided. For example, the context of "San Francisco" in the notification is a travel context, as indicated by the term "book flight." The contextual information server 150 can take into account the context and my instead include travel related options, such as "Rental Cars," "Hotels," "Restaurants," etc.

The user device 110 may display the graphical panel 160 while the notification is being displayed. For example, notifications may be shown on the user device 110 for a limited time, e.g., one second, two seconds, or some other length of time, and the notification and the graphical panel 160 may both disappear after the limited time. In another example, the notifications and graphical panel 160 may be shown on the user device 110 until the user provides input to the user device 110 that causes the notification or the graphical panel 160 to no longer be displayed. In some implementations, the user device 110 may operate in a mode where a user is not actively using the user device 110, e.g., a locked mode. In the mode where a user is not actively using the user device 110, the notifications and graphical panels may be shown once the user device 110 detects that the user is actively using the device, e.g., when the user interacts with the user device 110 while the user device 110 is in a locked mode.

Figure 2:
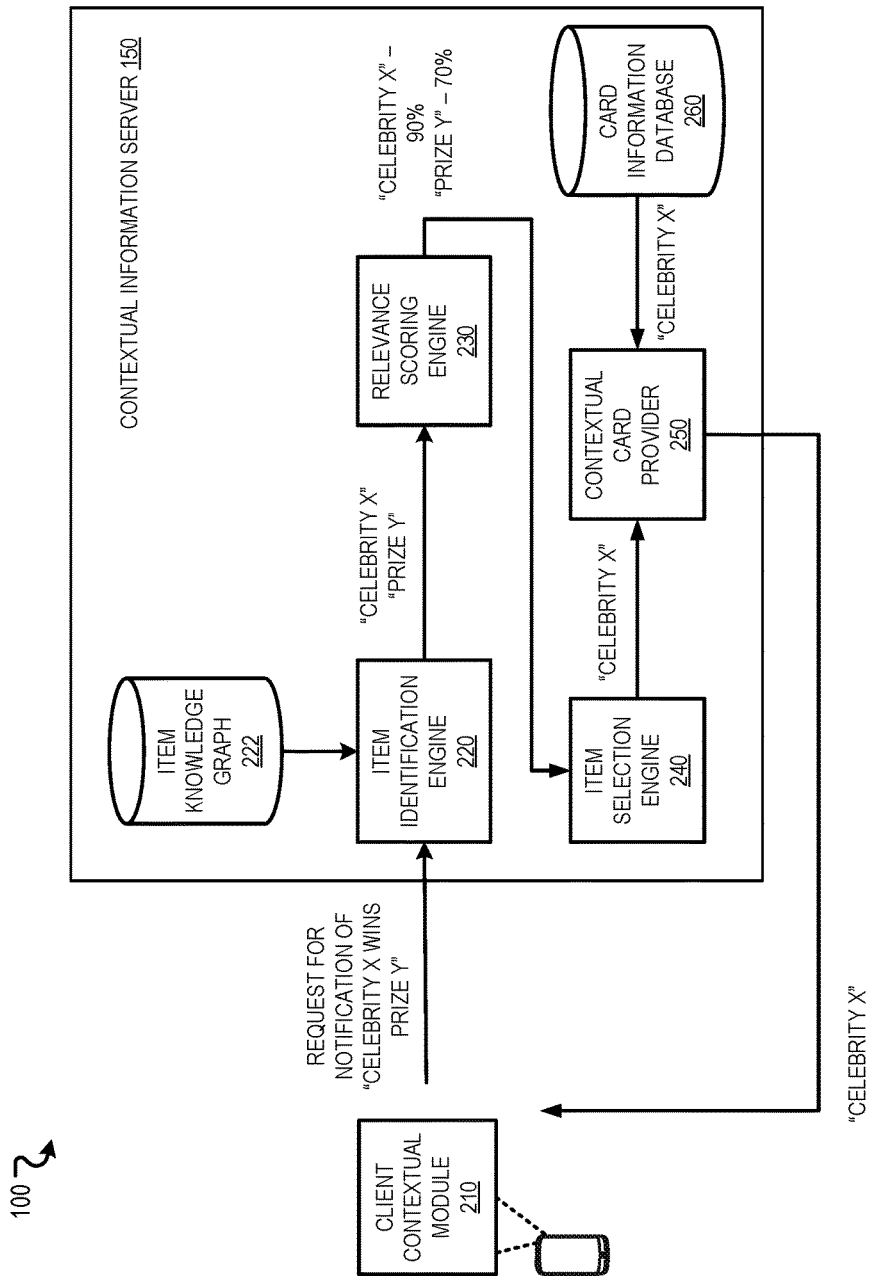
FIG. 2 is a more detailed block diagram of the example environment in which contextual information is provided for a notification.

FIG. 2 is a more detailed block diagram of the example environment 100 in which contextual information is provided for a notification. The environment 100 includes a client contextual module 210 on a user device and the contextual information server 150. The contextual information server 150 includes an item identification engine 220, an item knowledge graph 222, a relevance scoring engine 230, an item selection engine 240, a contextual card provider 250, and a card information database 260. In some implementations, the client contextual module 210 may be provided on the user device 110 shown in FIG. 1. In other implementations, the client contextual module 210 may be provided on another user device different than the user device 110 shown in FIG. 1.

The client contextual module 210 determines that the user device has obtained a notification to be displayed on the user device. The notification may be obtained by the user device in response to an occurrence of a trigger event. For example, the client contextual module 210 may determine that a news application has generated a notification of "Celebrity X wins Prize Y" in response to the news application receiving a push notification from a news server. The client contextual module 210 may determine notifications are obtained by receiving indications that notifications have been generated by one or more applications running on the user device or generated by the operating system of the user device. For example, the operating system of the user device may provide the client contextual module 210 all notifications before the operating system displays the notifications regardless of whether the notifications were generated by the operating system or generated by applications running on the user device.

In response to determining that the user device has obtained a notification in response to an occurrence of a trigger event, the client contextual module 210 generates a request to the contextual information server 150 for contextual information for the notification. For example, the client contextual module 210 may generate a request to the contextual information server 150 for contextual information for the notification of "Celebrity X wins Prize Y."

The client contextual module 210 may include information about the notification in the request. For example, the client contextual module 210 may obtain a tree based document object model that represents the notification and include the model in the request. The document object model may define text that appears in the notification and the appearance of the text, e.g., size, color, position, font, or other formatting, of the text. In another example, the client contextual module 210 may generate a screen shot of the notification as displayed on the user device and include the screenshot in the notification.

In some implementations, the client contextual module 210 may include the information about the notification in the request by additionally or alternatively determining additional information about the notification and including the additional information in the request. The additional information about the request may include one or more of an indication of the application for which the notification was generated, a location of the user device 110, or an identity of the user. For example, the client contextual module 210 may determine that the user device 110 is located in Atlanta and include a location of "Atlanta" in the request.

The client contextual module 210 then provides the request to the item identification engine 220. For example, the client contextual module 210 provides the request to the item identification engine 220 without the user providing any indication that contextual information is desired after the notification is obtained by the user device.

In response to providing the request to the item identification engine 220, the client contextual module 210 receives a contextual card and renders the contextual card. For example, the client contextual module 210 receives a contextual card for the celebrity "Celebrity X" that includes a full name, a brief description, and a selectable option for viewing images of the celebrity, and then renders the contextual card adjacent to the notification on top of was previously being displayed. In some implementations, the client contextual module 210 may display the contextual card simultaneously with the notification. For example, the client contextual module 210 may cause the user device to delay displaying the notification until the contextual card is received, and then display the notification simultaneously with the contextual card. In another example, the client contextual module 210 may cause the user device to delay displaying the notification until an indication that no contextual card is available for the notification is received from the contextual information server 150 and then display the notification without any contextual card.

The item identification engine 220 receives the request for contextual information for a notification and identifies one or more search items from content in the notification. For example, the item identification engine 220 may obtain a request that includes a notification of "Celebrity X wins Prize Y" that is generated on a user device in response to a news application running in the background of the user device receiving a push notification from a news server. As used in this specification, a "search item" is a concept or thing that can be used by a search system to conduct a search of information. A search item may be referred to by a text fragment, e.g., a term or phrase, and search items are distinguishable from one another, e.g., based on context. For example, a search item may be a keyword, and instance of a particular entity, a proper name, an entity or relation modeled by a node or an edge in a knowledge graph, and the like.

The item identification engine 220 may extract text from the request. For example, the item identification engine 220 may extract the text "Celebrity X wins Prize Y" from the request. The item identification engine 220 may extract the text by parsing a document object model representing the notification, performing optical character recognition on a screenshot of the notification as displayed on the user device, or analyzing content of the notification indicated in the request in some other manner.

The item identification engine 220 identifies the one or more search items from the extracted text using the item knowledge graph 222. For example, the item identification engine 220 may identify that the text "Celebrity X" in the notification matches the name of a celebrity "Celebrity X" in the item knowledge graph 222 and the text "Prize Y" in the notification matches the name of a prize "Prize Y" in the item knowledge graph 222. The item knowledge graph 222 may be a knowledge graph that includes nodes for search items, edges that indicate relationships between the nodes, and contextual information describing the search items represented by the nodes.

In some implementations, the item identification engine 220 may identify the one or more search items from the extracted text based on additional information in the request. For example, the item identification engine 220 may determine that the request indicates that user device 110 is in Atlanta, e.g., based on geo-location data associated with the request or the user device, and focus on search items located in Atlanta. In another example, the item identification engine 220 may determine that the request indicates that the request is from "User A" and focus on search items for which "User A" has received information for during the last hour, day, week, month, or some other period of time.

The relevance scoring engine 230 may receive the search items identified by the item identification engine 220 and determine a relevance score for each of the search items. The relevance score may reflect a confidence that the search item is relevant to the user, i.e., a degree of confidence that the user would like to see contextual information about the search item. For example, the relevance scoring engine 230 may receive an indication that the search items celebrity "Celebrity X" and prize "Prize Y" were identified in the notification, determine a relevance score of 90% for the celebrity "Celebrity X" indicating a high degree of confidence that the user would like to see contextual information about celebrity "Celebrity X," and determine a relevance score of 80% for the prize "Prize Y" indicating a slightly less high degree of confidence that the user would like to see contextual information about the prize "Prize Y."

The relevance scoring engine 230 may determine a relevance score for a search item based on an engagement of users with the search items. Examples of engagement include providing search queries for resources relevant to the search item, requesting a resource indexed as relevant to the search item, or some other significant signal of interest in the search item. The relevance scoring engine 230 may determine relevance scores indicating higher degrees of confidence that the user would like to see contextual information about a search item with greater engagement and may determine relevance scores indicating lower degrees of confidence that the user would like to see contextual information about a search item with lesser engagement. The relevance scoring engine 230 may determine the engagement for a search item from, for example, analyzing search query history logs or resource request logs.

Additionally or alternatively, the relevance scoring engine 230 may determine a relevance score for a search item based on natural language processing on the content from which the search item is identified. For example, the relevance scoring engine 230 may determine relevance scores indicating higher degrees of confidence that the user would like to see contextual information about search items identified from text that is a subject of a sentence and may determine relevance scores indicating lower degrees of confidence that the user would like to see contextual information about search items identified from text that is an object of a sentence.

Additionally or alternatively, the relevance scoring engine 230 may determine a relevance score for a search item based on an appearance of the text from which the search item was identified. For example, the relevance scoring engine 230 may determine a relevance score that reflects a higher degree of confidence for search items identified from text that appears earlier in the notification. In another example, the relevance scoring engine 230 may determine relevance scores that reflect a higher degree of confidence for search items identified from text that is bolded as the text may be bolded because the text is important. In another example, the relevance scoring engine 230 may determine relevance scores that reflect a higher degree of confidence for search items identified from text that is a larger size, a different color, or aligned differently from the majority of text in the notification because different appearance of the text may indicate that the text is important.

The item selection engine 240 may obtain the relevance scores and select one or more search items for which to provide contextual information to the user. For example, the item selection engine 240 may receive an identification of the celebrity "Celebrity X" labeled with a relevance score of 90% and an identification of the prize "Prize Y" labeled with the relevance score of 70% and, in response, select the celebrity "Celebrity X" and not select the prize "Prize Y" to provide contextual information.

The item selection engine 240 may select the search items based on determining whether the search items have respective relevance scores that satisfy a relevance threshold. For example, the item selection engine 240 may select the celebrity "Celebrity X" as the relevance score of 90% is greater than a relevance threshold of 60%, 65%, 85%, or some other percentage less than 90%. In another example, the item selection engine 240 may not select the prize "Prize Y" as the relevance score of 70% is lower than a relevance threshold of 85%, 95%, 95%, or some other percentage above 70%.

In some implementations, the item selection engine 240 may additionally or alternatively select the search items based on a maximum. For example, the item selection engine 240 may select a maximum of one, two, four, or some other number of cards and select the maximum number of search items with relevance scores that reflect the greatest degree of confidence in relevance. In some implementations, the item selection engine 240 may additionally or alternatively select the search items based on a minimum. For example, the item selection engine 240 may select a minimum of one, two, four, or some other number of cards with relevance scores that reflect the greatest degree of confidence in relevance.

The contextual card provider 250 may obtain contextual cards including contextual information for the selected search items and provide the contextual cards to the client contextual module 210. For example, the contextual card provider 250 may obtain an identification of the celebrity "Celebrity X" from the item selection engine 240 and provide a contextual card for celebrity "Celebrity X" to the client contextual module 210. In the example, the contextual card includes a full name and brief description for celebrity "Celebrity X" and a selectable option for viewing images of celebrity "Celebrity X" appeared.

The contextual card provider 250 may obtain contextual cards by generating contextual cards for search items. For example, the contextual card provider 250 may obtain, from the item knowledge graph 222, a full name, a brief description, and an indication that images of celebrity "Celebrity X" are available and then generate a contextual card that includes a full name and brief description for celebrity "Celebrity X" and a selectable option for viewing movies in which celebrity "Celebrity X" appeared. In another example, the contextual card provider 250 may perform searches on celebrity "Celebrity X" to determine a full name, a brief description, and whether images of celebrity "Celebrity X" are available.

In some implementations, before generating a contextual card for a search item, the contextual card provider 250 may determine whether a contextual card for the search item already exists in a card information database 260. For example, the contextual card provider 250 may query the card information database 260 for a contextual card for the celebrity "Celebrity X." Where the card information database 260 includes an existing contextual card for the search item, the card information database 260 may provide the contextual card to the contextual card provider 250 so that the contextual card provider 250 can provide the existing contextual card to the client contextual module 210 instead of generating a new contextual card.

Figure 3:
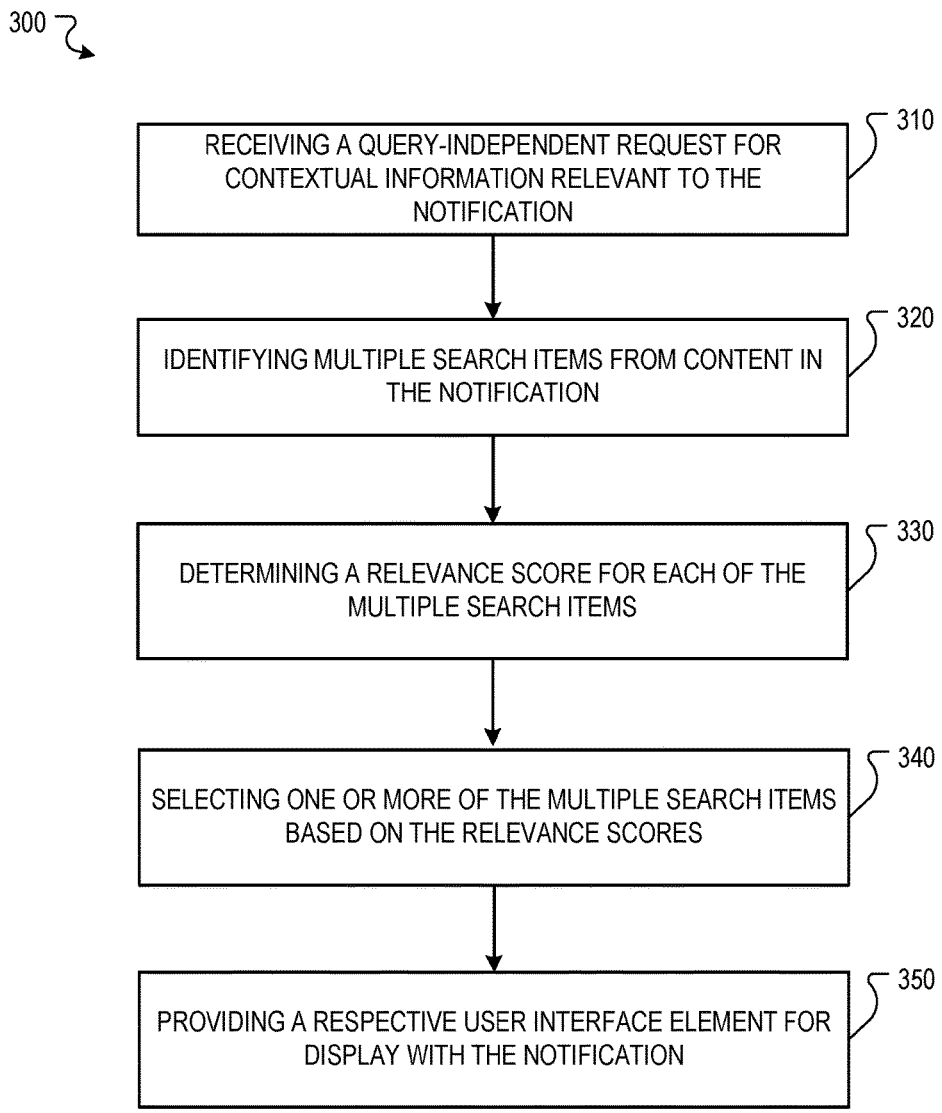
FIGS. 3 and 4 are flow diagrams of example processes for providing contextual information for a notification.

FIG. 3 is a flow diagram of a process 300 for providing contextual information for a notification. For example, the process 300 can be used by the contextual information server 150 from the environment 100.

The process 300 includes receiving a query-independent request for contextual information relevant to a notification in response to the user device obtaining the notification in response to an occurrence of a trigger event (310). For example, the item identification engine 220 may receive a request that includes a document object model of a notification of "Buy a ticket for Movie X at Theater Y" that is generated from a reminder that a user set in a calendar application.

The process 300 includes identifying multiple search items from content in the notification (320). For example, the item identification engine 220 may extract text "Movie X" and "Theater Y" from text in the notification and, in response, identify a movie "Movie X" and a place of business "Theater Y" from the respective text.

The process 300 includes determining a relevance score for each of the identified multiple search items (330). For example, the relevance scoring engine 230 may receive an identification of the movie "Movie X" and determine that searches for movie "Movie X" are very popular and, in response, determine a relevance score indicating a high degree of confidence that the user would like to see contextual information for the movie "Movie X." In another example, the relevance scoring engine 230 may receive an identification of the place of business "Theater Y" and determine that searches for the place of business "Theater Y" are not popular and, in response, determine a relevance score indicating a low degree of confidence that the user would like to see contextual information for the place of business "Theater Y." In the example, additionally or alternatively, the relevance scoring engine 230 determine a relevance score indicating a low degree of confidence that the user would like to see contextual information for the place of business "Theater Y" in response to determining that a user typically goes to place of business "Theater Y" so is unlikely to want to receive contextual information on the place of business.

The process 300 includes selecting search items based on the relevance scores (340). For example, the item selection engine 240 may select the movie "Movie X" for providing contextual information based on a high relevance score of 95% for the movie satisfying a relevance threshold of 80% and not select the place of business "Theater Y" based on a low relevance score of 33% for the place of business not satisfying the relevance threshold of 80%.

The process 300 includes, for each of the selected search items, providing a respective contextual card (350). For example, in response to the item selection engine 240 selecting the movie "Movie X" and not selecting the place of business "Theater Y," the contextual card provider 250 may generate a contextual card for the movie "Movie X" and provide the contextual card to the client contextual module 210, and not generate or provide a contextual card for the place of business "Theater Y."

In the example described, a determined intent for one search item may be higher than any other search item and the other search items can be ignored. However, in some implementations, the process 300 may provide contextual cards based on multiple selected search items. For example, for a request that includes a document object model of a notification that defines the text "Book a flight to San Francisco," the item identification engine 220 may extract the text "Book a flight to San Francisco" from the request and identify a city "San Francisco" from the text "San Francisco," and extract the text "flight" from the request and identify an object "flight" from the text "flight." The relevance scoring engine 230 may use natural language processing to determine that the notification is regarding a trip to a destination where the destination is the city "San Francisco," and in response, determine a relevance score indicating a high degree of confidence that the user would like to see contextual information for the city "San Francisco." The relevance scoring engine 230 may determine that the notification is regarding a trip to a destination and the object "flight" refers to the type of transportation, and in response, determine a relevance score indicating a high degree of confidence that the user would like to see contextual information for the object "flight." The relevance scoring engine 230 may then select both the city "San Francisco" and the object "flight" and, in response, provide a contextual card with flight related information for the city "San Francisco."

In some implementations, the process 300 can include additional steps, fewer steps, or some of the steps can be divided into multiple steps. For example, the contextual information server 150 may not perform steps 330 and 340 and instead provide contextual cards for each identified search item.

Figure 4:
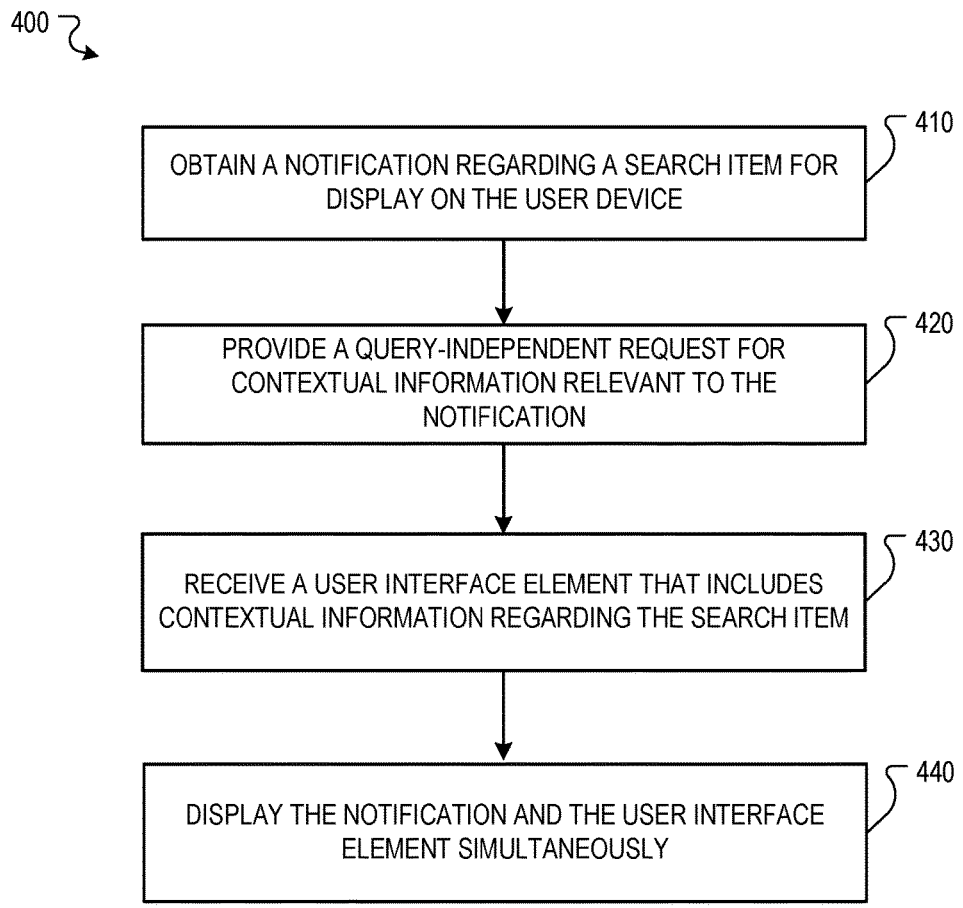

FIG. 4 is a flow diagram of a process 400 for providing contextual information for a notification. For example, the process 400 can be used by the client contextual module 210 from the environment 100.

The process 300 includes obtaining a notification regarding a search item for display on a user device (410). For example, the client contextual module 210 may determine that a calendar application on the user device has generated a notification of "Buy a ticket for Movie X at Theater Y."

The process 400 includes providing a query-independent request for contextual information relevant to the notification (420). For example, the client contextual module 210 may, in response to the user device obtaining the notification, provide the contextual information server 150 a request that includes a document object model of a notification that defines the text "Buy a ticket for Movie X at Theater Y" and how the text should appear in the notification.

The process 400 includes receiving a user interface element that includes contextual information regarding the search item (430). For example, the client contextual module 210 may, in response to providing the request to the contextual information server 150, receive a card for the movie "Movie X" from the contextual information server 150.

The process 400 includes displaying the notification and the user interface element simultaneously (440). For example, the client contextual module 210 may provide the card for the movie "Movie X" to an operating system of a user device to cause the user device to display the notification "Buy a ticket for Movie X at Theater Y" and simultaneously display the card immediately below the notification.

In some implementations, the process 400 can include additional steps, fewer steps, or some of the steps can be divided into multiple steps. For example, the client contextual module 210 may additionally perform functions of the contextual information server 150.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML, page) to a user device (e.g., for purposes of displaying data to and receiving user input from a user interacting with the user device). Data generated at the user device (e.g., a result of the user interaction) can be received from the user device at the server.

Figure 5:
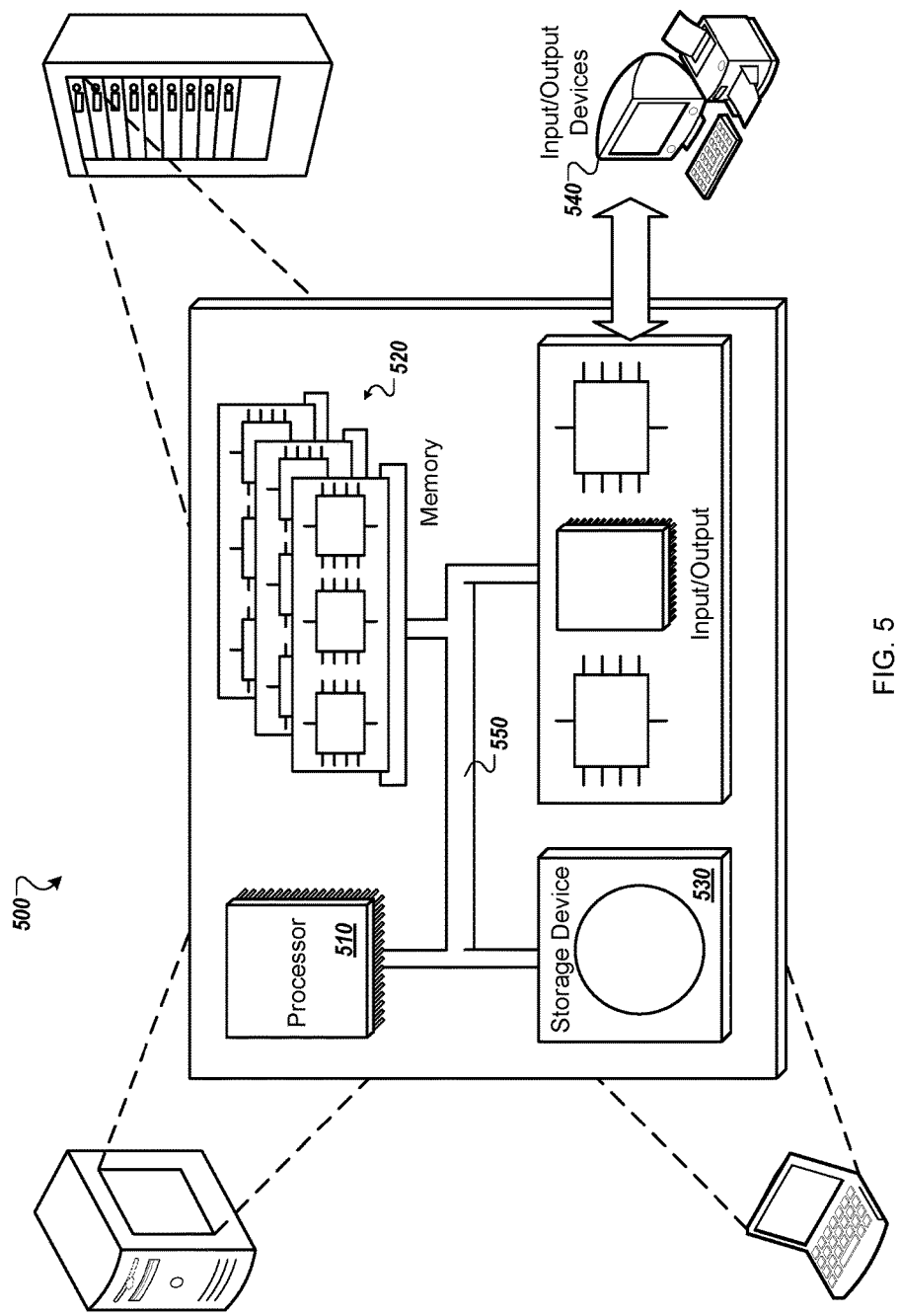
FIG. 5 is a schematic diagram of a computer system.

An example of one such type of computer is shown in FIG. 5, which shows a schematic diagram of a generic computer system 500. The system 500 can be used for the operations described in association with any of the computer-implement methods described previously, according to one implementation. The system 500 includes a processor 510, a memory 520, a storage device 530, and an input/ output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

While this specification contains many specific implementation details, these should not be construed as limitations on the scope of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented in a data processing apparatus, the method comprising:
    receiving, from a user device in response to the user device obtaining a notification for display on the user device in response to an occurrence of a trigger event, a query-independent request for contextual information relevant to the notification, where the query-independent request indicates text in the notification for display on the user device;
    identifying, based at least on the text indicated by the query-independent request for display on the user device, multiple search items from content in the notification;
    determining a relevance score for each of the multiple search items;
    selecting one or more of the multiple search items based on the relevance scores; and
    providing, to the user device for each of the selected one or more multiple search items, a separate respective user interface element for display on the user device along with display of the notification, wherein each user interface element includes contextual information regarding the respective search item.

2. The method of claim 1, wherein receiving, from a user device in response to the user device obtaining a notification for display on the user device in response to an occurrence of a trigger event, a query-independent request for contextual information relevant to the notification comprises:
    receiving a query-independent request that does not include one or more terms entered by a user and includes the content in the notification.

3. The method of claim 1, wherein receiving, from a user device in response to the user device obtaining a notification for display on the user device in response to an occurrence of a trigger event, a query-independent request for contextual information relevant to the notification comprises:
    receiving, from the user device in response to the user device generating the notification for display on the user device in response to the occurrence of the trigger event, a query-independent request for contextual information relevant to the notification.

4. The method of claim 1, wherein receiving, from a user device in response to the user device obtaining a notification for display on the user device in response to an occurrence of a trigger event, a query-independent request for contextual information relevant to the notification comprises:
    receiving, from the user device in response to the user device obtaining the notification for display on the user device in response to determining that a background application is providing the notification for display.

5. The method of claim 1, wherein the notification comprises a user interface element that is overlaid on a graphical user interface.

6. The method of claim 1, wherein the trigger event comprises one or more of satisfaction of reminder criteria for a calendar appointment, receipt of a text message from another user while not viewing a text message conversation with the other user, or an application on the user device receiving a push notification from a server.

7. The method of claim 1, wherein identifying multiple search items from the content in the notification comprises:
    extracting, from the query-independent request, an indication of an application corresponding to the notification; and
    identifying the multiple search items based at least on the application corresponding to the notification.

8. A system comprising:
a data processing apparatus; and
a non-transitory computer readable storage medium in data communication with the data processing apparatus and storing instructions executable by the data processing apparatus and upon such execution cause the data processing apparatus to perform operations comprising:
receiving, from a user device in response to the user device obtaining a notification for display on the user device in response to an occurrence of a trigger event, a query-independent request for contextual information relevant to the notification, where the query-independent request indicates text in the notification for display on the user device;
identifying, based at least on the text indicated by the query-independent request for display on the user device, multiple search items from content in the notification;
determining a relevance score for each of the multiple search items;
selecting one or more of the multiple search items based on the relevance scores; and
providing, to the user device for each of the selected one or more multiple search items, a separate respective user interface element for display on the user device along with display of the notification, wherein each user interface element includes contextual information regarding the respective search item.

9. The system of claim 8, wherein receiving, from a user device in response to the user device obtaining a notification for display on the user device in response to an occurrence of a trigger event, a query-independent request for contextual information relevant to the notification comprises:
receiving a query-independent request that does not include one or more terms entered by a user and includes the content in the notification.

10. The system of claim 8, wherein receiving, from a user device in response to the user device obtaining a notification for display on the user device in response to an occurrence of a trigger event, a query-independent request for contextual information relevant to the notification comprises:
receiving, from the user device in response to the user device generating the notification for display on the user device in response to the occurrence of the trigger event, a query-independent request for contextual information relevant to the notification.

11. The system of claim 8, wherein receiving, from a user device in response to the user device obtaining a notification for display on the user device in response to an occurrence of a trigger event, a query-independent request for contextual information relevant to the notification comprises:
receiving, from the user device in response to the user device obtaining the notification for display on the user device in response to determining that a background application is providing the notification for display.

12. The system of claim 8, wherein the notification comprises a user interface element that is overlaid on a graphical user interface.

13. The system of claim 8, wherein the trigger event comprises one or more of satisfaction of reminder criteria for a calendar appointment, receipt of a text message from another user while not viewing a text message conversation with the other user, or an application on the user device receiving a push notification from a server.

14. The system of claim 8, wherein identifying multiple search items from the content in the notification comprises:
extracting, from the query-independent request, an indication of an application corresponding to the notification; and
identifying the multiple search items based at least on the application corresponding to the notification.

15. A method implemented in a data processing apparatus, the method comprising:
obtaining, in response to an occurrence of a trigger event and by a user device, a notification for display on the user device, the notification regarding a search item and including text for display on the user device;
in response to obtaining the notification for display on the user device, providing, by the user device to a contextual information server, a query-independent request for contextual information relevant to the notification, where the query-independent request indicates the text in the notification for display on the user device;
receiving, in response to the query-independent request, a user interface element that includes contextual information regarding the search item; and
displaying the notification and the user interface element simultaneously on the user device.

16. The method of claim 15, wherein providing by the user device to a contextual information server, a query-independent request for contextual information relevant to the notification comprises:
providing a query-independent request that does not include one or more terms entered by a user and includes the content in the notification.

17. The method of claim 15, wherein the notification comprises a user interface element that is overlaid on a graphical user interface.

18. The method of claim 15, wherein the trigger event comprises one or more of satisfaction of reminder criteria for a calendar appointment, receipt of a text message from another user while not viewing a text message conversation with the other user, or an application on the user device receiving a push notification from a server.

19. The method of claim 1, wherein receiving, from a user device in response to the user device obtaining a notification for display on the user device in response to an occurrence of a trigger event, a query-independent request for contextual information relevant to the notification comprises:
receiving, in the request, a representation of the notification to be displayed on the user device.

20. The method of claim 1, wherein receiving, from a user device in response to the user device obtaining a notification for display on the user device in response to an occurrence of a trigger event, a query-independent request for contextual information relevant to the notification comprises:
receiving, in the request, an image of the notification as displayed on the user device.

* * * * *